United States Patent
Gaither (10) Patent No.: US 10,592,939 B2
(45) Date of Patent: Mar. 17, 2020

(54) SYSTEMS AND METHODS FOR IN-VEHICLE CHARGING TO OFFSET A FARE

(71) Applicant: Toyota Motor Engineering & Manufacturing North America, Inc., Erlanger, KY (US)

(72) Inventor: Geoffrey David Gaither, Brighton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 478 days.

(21) Appl. No.: 15/377,841

(22) Filed: Dec. 13, 2016

(65) Prior Publication Data
US 2018/0165727 A1 Jun. 14, 2018

(51) Int. Cl.
*G07B 15/02* (2011.01)
*G06Q 30/02* (2012.01)
(Continued)

(52) U.S. Cl.
CPC .......... *G06Q 30/0284* (2013.01); *B60L 50/20* (2019.02); *B60L 53/00* (2019.02); *B60L 53/665* (2019.02); *B60L 2270/00* (2013.01); *G06Q 2240/00* (2013.01); *H02J 7/1407* (2013.01); *Y02T 10/7005* (2013.01); *Y02T 10/7072* (2013.01); *Y02T 90/121* (2013.01); *Y02T 90/128* (2013.01); *Y02T 90/14* (2013.01);
(Continued)

(58) Field of Classification Search
USPC .......................................... 705/13, 7.11, 1.1
See application file for complete search history.

(56) References Cited

U.S. PATENT DOCUMENTS

| 6,183,403 B1 | 2/2001 | Dunn |
| 6,717,280 B1 | 4/2004 | Bienville |
| (Continued) | | |

FOREIGN PATENT DOCUMENTS

CN 201484212 U * 5/2010 .............. B60L 50/53

OTHER PUBLICATIONS

Lizzie Edmonds, "World's first self-powering gym uses energy from your Workout to keep the lights on (so don't take a break!)", DailyMail.com, Feb. 24, 2016, 8 pages.
(Continued)

*Primary Examiner* — Akiba K Allen
(74) *Attorney, Agent, or Firm* — Christopher G. Darrow; Darrow Mustafa PC (57) ABSTRACT

System, methods, and other embodiments described herein relate to adjusting a trip fare according to in-vehicle charging provided by a passenger. In one embodiment, a method includes, in response to initiating a trip in the vehicle for a passenger, accumulating the trip fare as a function of traveling a route to fulfill the trip. The method includes metering one or more charging devices to identify a metered charge produced by the passenger operating the one or more charging devices during the trip. The method includes computing a fare offset according to at least the metered charge to identify an amount by which the trip fare is to be discounted. The method includes adjusting the trip fare according to the fare offset to account for an electric charge provided to the vehicle during the trip.

20 Claims, 5 Drawing Sheets

(51) Int. Cl.
  *B60L 53/66* (2019.01)
  *B60L 53/00* (2019.01)
  *B60L 50/20* (2019.01)
  *H02J 7/14* (2006.01)
(52) U.S. Cl.
  CPC ............ *Y02T 90/163* (2013.01); *Y02T 90/169* (2013.01); *Y04S 30/14* (2013.01); *Y10S 903/907* (2013.01)

(56) References Cited

U.S. PATENT DOCUMENTS

| | | | |
|---|---|---|---|
| 8,926,477 | B2 | 1/2015 | Lynn |
| 2008/0091342 | A1 | 4/2008 | Assael |
| 2010/0280675 | A1* | 11/2010 | Tate, Jr. ................ H01M 10/44 700/295 |
| 2013/0081892 | A1 | 4/2013 | Kronfeld et al. |
| 2014/0209399 | A1* | 7/2014 | Mireshghi ............. B60L 11/007 180/65.31 |
| 2015/0339928 | A1 | 11/2015 | Ramanujam |
| 2016/0125735 | A1 | 5/2016 | Tuukkanen |
| 2018/0106640 | A1* | 4/2018 | Padrones ................ G01D 4/02 |

OTHER PUBLICATIONS

Victoria Woollaston, "The self-driving car with a built-in GYM: Bars and pedals help passengers exercise and a fridge stores post-workout drinks", DailyMail.com, Feb. 24, 2016, 5 pages.

* cited by examiner

SYSTEMS AND METHODS FOR IN-VEHICLE CHARGING TO OFFSET A FARE

TECHNICAL FIELD

The subject matter described herein relates in general to systems for computing fare offsets and, more particularly, to determining a fare offset for a trip according to electric energy generated by a passenger during the trip.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

While hybrid electric and fully electric vehicles experience expanding roles within the vehicle market, infrastructure to recharge these vehicles is still primarily based out of an owner's home or a warehouse in the case of fleet vehicles. Thus, fully electric vehicles tend to be tethered to a home base location according to a range associated with constraints on battery charge because options for recharging a battery while in transit are limited. The lack of available charging options can effect an overall range of electric vehicles and cause difficulties in relation to using electric vehicles as, for example, taxis and/or ridesharing services.

SUMMARY

An example of a fare adjustment system that provides fare offsets according to an amount of electric charge generated by a passenger is presented herein. In one embodiment, the fare adjustment system monitors for when a trip is initiated in a vehicle. Thereafter, electric charge provided from the use of various charging devices (e.g., stationary bike) in the vehicle is metered and used to compute an offset or credit towards the incurred fare for a trip. Accordingly, the fare adjustment system can discount a passenger's fare according to an amount of charge generated by the passenger during the trip. In this way, the fare adjustment system can provide incentives to riders to generate an electric charge that is usable by the vehicle to extend a range of the vehicle and/or to power additional components that may otherwise be disabled.

In one embodiment, a fare adjustment system of a vehicle is disclosed. The fare adjustment system includes one or more processors and a memory that is communicably coupled to the one or more processors. The memory stores a meter module that includes instructions that when executed by the one or more processors cause the one or more processors to, in response to initiating a trip in the vehicle for a passenger, accumulate a trip fare as a function of traveling a route to fulfill the trip. The meter module includes instructions to meter one or more charging devices to identify a metered charge produced by the passenger operating the one or more charging devices during the trip. The memory stores a fare module including instructions that when executed by the one or more processors cause the one or more processors to compute a fare offset according to at least the metered charge to identify an amount by which the trip fare is to be discounted. The fare module includes instructions to adjust the trip fare according to the fare offset to account for an electric charge provided to the vehicle during the trip.

In one embodiment, a non-transitory computer-readable medium is disclosed. The computer-readable medium stores instructions that when executed by one or more processors cause the one or more processors to perform the disclosed functions. The instructions include instructions to, in response to initiating a trip in the vehicle for a passenger, accumulate a trip fare as a function of traveling a route to fulfill the trip. The instructions include instructions to meter one or more charging devices to identify a metered charge produced by the passenger operating the one or more charging devices during the trip. The instructions include instructions to compute a fare offset according to at least the metered charge to identify an amount by which the trip fare is to be discounted. The instructions include instructions to adjust the trip fare according to the fare offset to account for an electric charge provided to the vehicle during the trip.

In one embodiment, a method of adjusting a trip fare of a vehicle is disclosed. The method includes, in response to initiating a trip in the vehicle for a passenger, accumulating the trip fare as a function of traveling a route to fulfill the trip. The method includes metering one or more charging devices to identify a metered charge produced by the passenger operating the one or more charging devices during the trip. The method includes computing a fare offset according to at least the metered charge to identify an amount by which the trip fare is to be discounted. The method includes adjusting the trip fare according to the fare offset to account for an electric charge provided to the vehicle during the trip.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with in-vehicle charging and providing fare offsets according to the in-vehicle charging are disclosed herein. As mentioned in the background, operating an electric or hybrid electric vehicle may encounter difficulties because of a lack of options for charging batteries, thus, potentially influencing a range of the vehicles. Moreover, additional uses of electric vehicles may also be effected. For example, a feasibility of using an electric vehicle as a taxi or ridesharing vehicle may be influenced by an inability to recharge the vehicle easily.

Accordingly, in one embodiment, a vehicle is provided that includes mechanisms for in-vehicle charging. That is, passengers of the vehicle can generate an electric charge by operating charging devices while the vehicle is underway. For example, the charging devices can include stationary bikes, hand cranks, and other similar mechanical-to-electrical devices that generate an electric charge when operated by a passenger. In this way, a supplemental charge can be provided to a battery of the vehicle to, for example, extend a range of the vehicle.

Additionally, a fare adjustment system, in one embodiment, meters an amount of charge produced by a passenger and offsets a trip fare accordingly. In this way, the system can incentivize passengers to provide an additional charge in order to overcome shortcomings associated with a lack of charging stations. Furthermore, the vehicle may also operate autonomously and thus a driver can operate a charging device instead of navigating the vehicle. Moreover, the vehicle may not include a driver when operating autonomously, and thus, the passengers can cooperatively provide charge to a battery of the vehicle. In either case, providing the electric charge generating devices within the vehicle facilitates improved range from passengers converting mechanical energy into additional electric charge.

Figure 1:
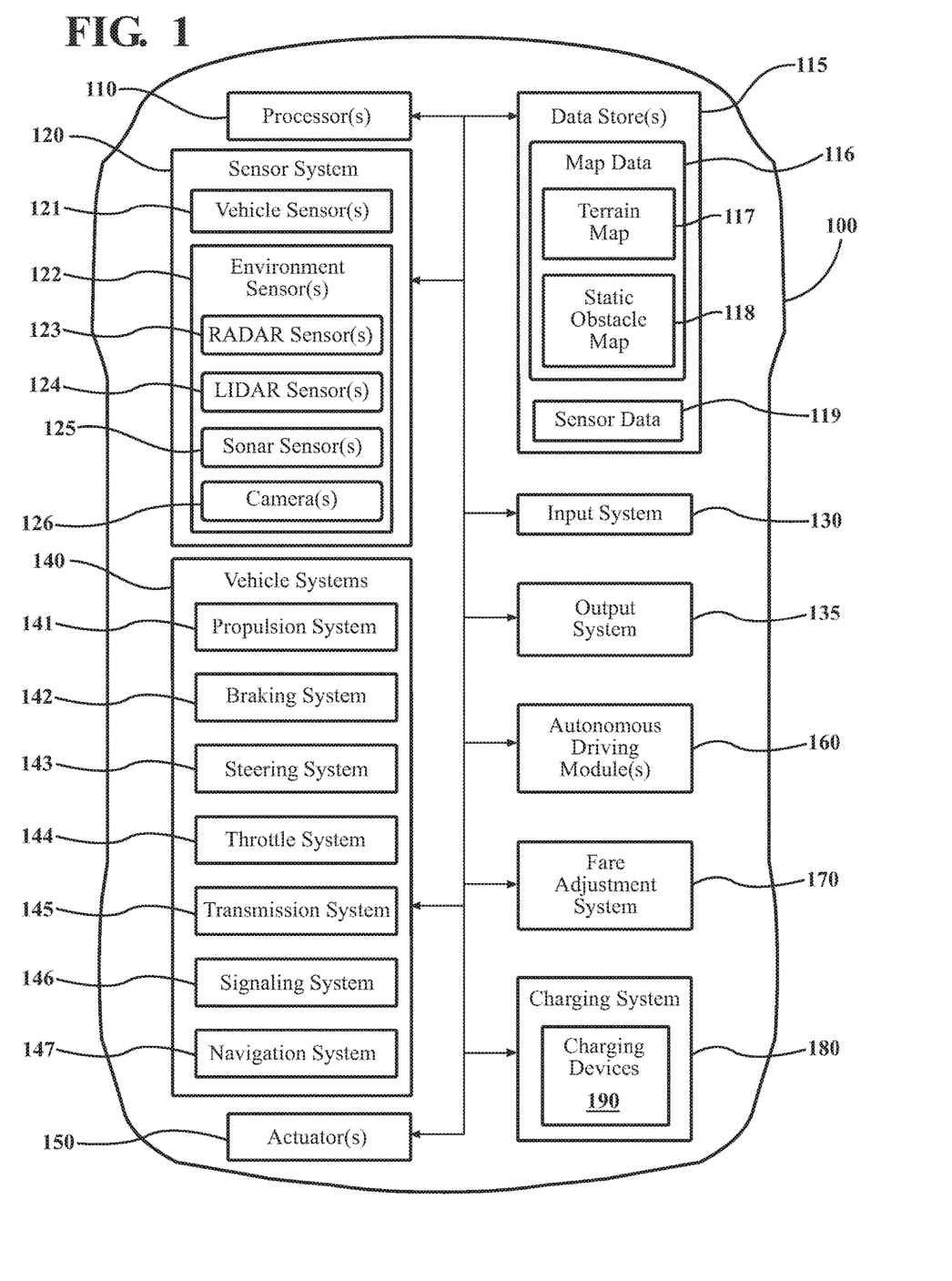
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that can accommodate one or more charging devices 190 that are part of a charging system 180 for replenishing charge of a battery within the vehicle 100 by a passenger.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a fare adjustment system 170 that is implemented to perform methods and other functions as disclosed herein relating to metering electricity generated by a passenger and appropriately adjusting a fare according to the metered amount of electric charge that is generated. The noted functions and methods will become more apparent with a further discussion of the figures.

Figure 2:
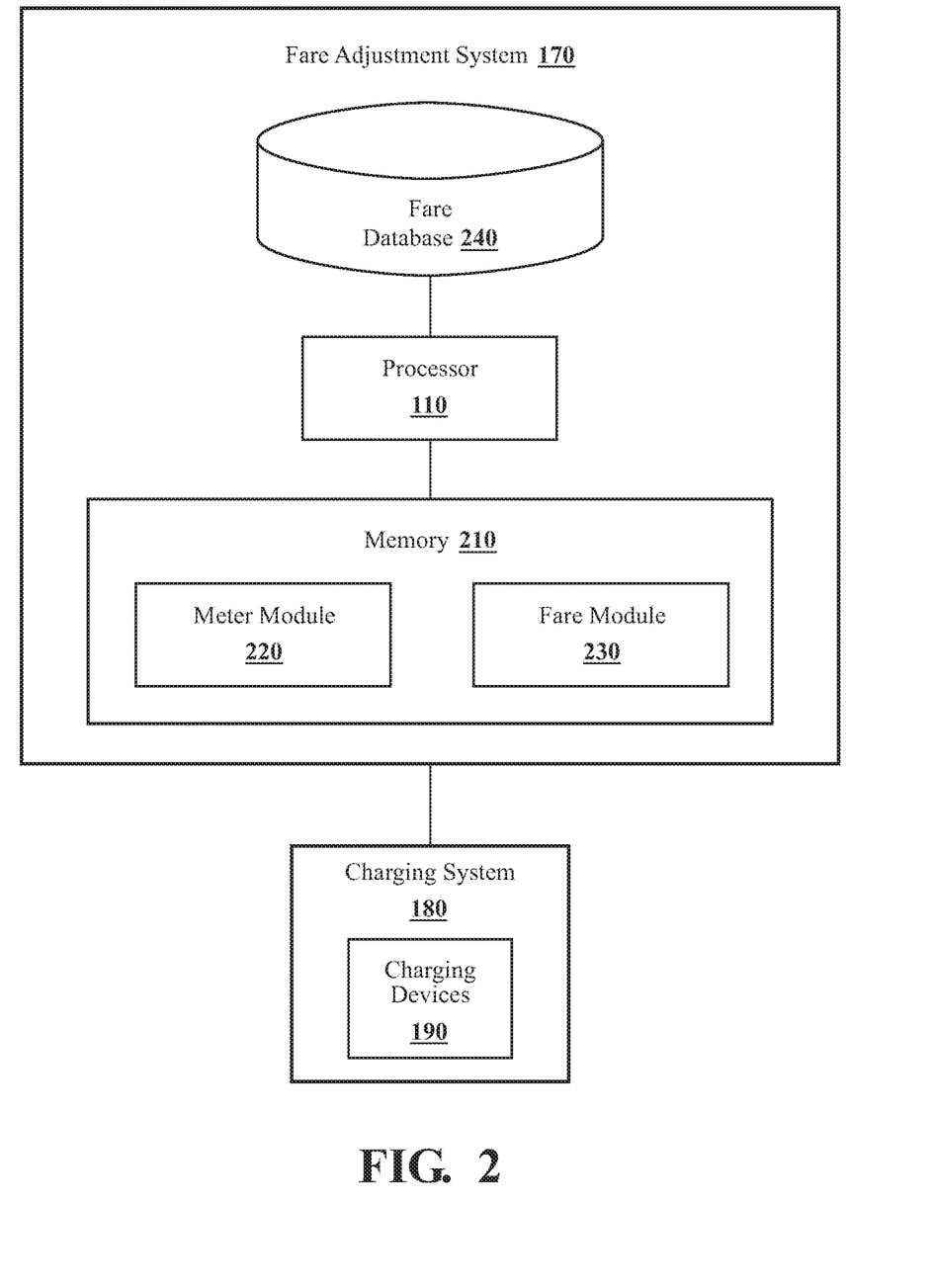
FIG. 2 illustrates one embodiment of a fare adjustment system that is associated with adjusting an incurred trip fare according to the electric charge generated during the trip.

With reference to FIG. 2, one embodiment of the fare adjustment system 170 of FIG. 1 is further illustrated. The fare adjustment system 170 is shown as including the processor 110 from the vehicle 100 of FIG. 1. Accordingly, the processor 110 may be a part of the fare adjustment system 170, the fare adjustment system 170 may include a separate processor from the processor 110 of the vehicle 100, or the fare adjustment system 170 may access the processor 110 through a data bus or another communication path. In one embodiment, the fare adjustment system 170 includes a memory 210 that stores a meter module 220 and a fare module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the meter module 220 generally includes instructions that function to control the processor 110 to identify aspects relating to the generation of electricity within the vehicle 100 through the charging system 180. In other words, the meter module 220 includes instructions to track how much electricity is produced when one or more passengers of the vehicle 100 operate charging devices 190 of the charging system 180 to re-energize a battery of the vehicle 100. In addition to metering generated electricity within the vehicle 100, the meter module 220 can also meter a trip when the vehicle 100 is being used as a taxi or rideshare vehicle. In other words, the meter module 220 accumulates a trip fare for use of the vehicle 100 by a passenger during a trip.

Moreover, in one embodiment, the fare module 230 includes instructions that function to control the processor 110 to compute various offsets such as a fare offset that is a function of at least the metered charge. The metered charge refers to an amount of electricity generated by the passengers using the charging devices 190 as determined by the meter module 220. In one embodiment, the fare module 230 computes the fare offset as a flat offset against the trip fare. For example, the fare module 230 provides the fare offset as a defined amount (e.g., $5.00) when the metered charge satisfies an offset threshold. The offset threshold indicates a minimum amount of electric charge that is to be generated by the passenger in order to obtain the fare offset. Thus, once the fare module 230 determines that the metered charge meets or exceeds the offset threshold, then the fare offset is applied to the trip fare as a discount for the passenger supplying the additional electric charge.

Alternatively, or in addition to the flat offset, in one embodiment, the fare module 230 computes the fare offset as a function of the metered charge and an offset rate. The offset rate is a compensation unit per kilowatt-hour of generated electricity that is used to compute the fare offset. In general, the offset rate is selected according to a current kilowatt/hour rate of a local electric utility company in order to mirror a rate that is otherwise assessed to charge the vehicle 100 from a utility infrastructure. Alternatively, the offset rate may be selected to correlate with current pricing for a gallon of gasoline or another comparable energy source. Furthermore, the offset rate can be selected according to additional aspects of the trip as will be discussed further subsequently. In either case, the fare module 230, for example, multiples the metered charge by the offset rate to compute the fare offset. In this way, the fare offset may be computed to correlate with the metered charge.

With continued reference to the fare adjustment system 170, in one embodiment, the system 170 includes a fare database 240. The fare database 240 is, in one embodiment, a complex electronic data structure stored in the memory 210 or another data store and that is configured with routines that can be executed by the processor 110 for analyzing stored data, providing stored data, organizing stored data, and so on. Thus, in one embodiment, the fare database 240 stores data used by the modules 220 and 230 in executing various functions. In one embodiment, the fare database 240 includes lookup tables of relevant fare rates, offset rates, rate modifiers, flat offsets, historical data about past fares, and so on.

For example, the fare rates include rates for different days of the week, times of day, rider characteristics (e.g., heavier), destination related modifications (e.g., rural vs urban) and so on. The offset rates include rates that define how much compensation is provided for electricity generated during a trip by a passenger through the charging system 180. Accordingly, the offset rates may include current utility rates, road segment specific modifications, average utility rates, and so on. The road segment specific modifications identify, for example, rates associated with particular segments of a roadway where the vehicle 100 has an increased demand for electricity over the segment and thus an increased offset rate is provided to incentivize a passenger to generate additional electric charge in an attempt to offset the increased demand. The increased demand may relate to, for example, terrain features (e.g., hill ascent), traffic, and so on. Additionally, the destination related modifications may include rate multipliers that increase a fare when the trip is to a rural location that is a predetermined distance outside of an operating area of the vehicle 100, and so on.

In either case, the fare database 240 stores the various rates and modifiers for use by the meter module 220 and the fare module 230 when determining fares and adjustments to fares. Moreover, the fare adjustment system 170 is generally discussed in the context of use with a taxi or ride-share. In both instances, the vehicle 100 is, for example, a for-hire vehicle that provides rides for passengers in exchange for a fare. It should also be appreciated that, in one embodiment, the vehicle 100 is used for private purposes and, thus, the fare offset is instead displayed to passengers as an amount by which recharging fees are offset (e.g., a portion of an electric utility bill is offset).

Accordingly, in one embodiment, the vehicle 100 may be operated by a human driver to transport one or more passengers to destinations for a fare. Alternatively, in another embodiment, the vehicle 100 operates autonomously without a human driver providing controls. Thus, in either case, the vehicle 100 transports passengers for a trip along a route. During the trip, the passengers may operate one or more of the charging devices 190 to provide electric charge back to the vehicle 100.

Figure 3A:
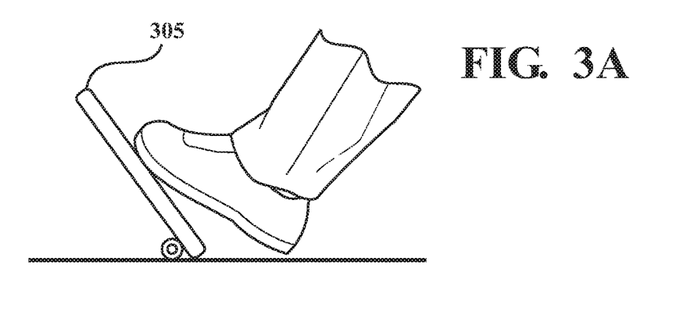
FIG. 3A illustrates an example of a charging device that may be used to perform in-vehicle charging.
Figures 3B, 3C, 3D:
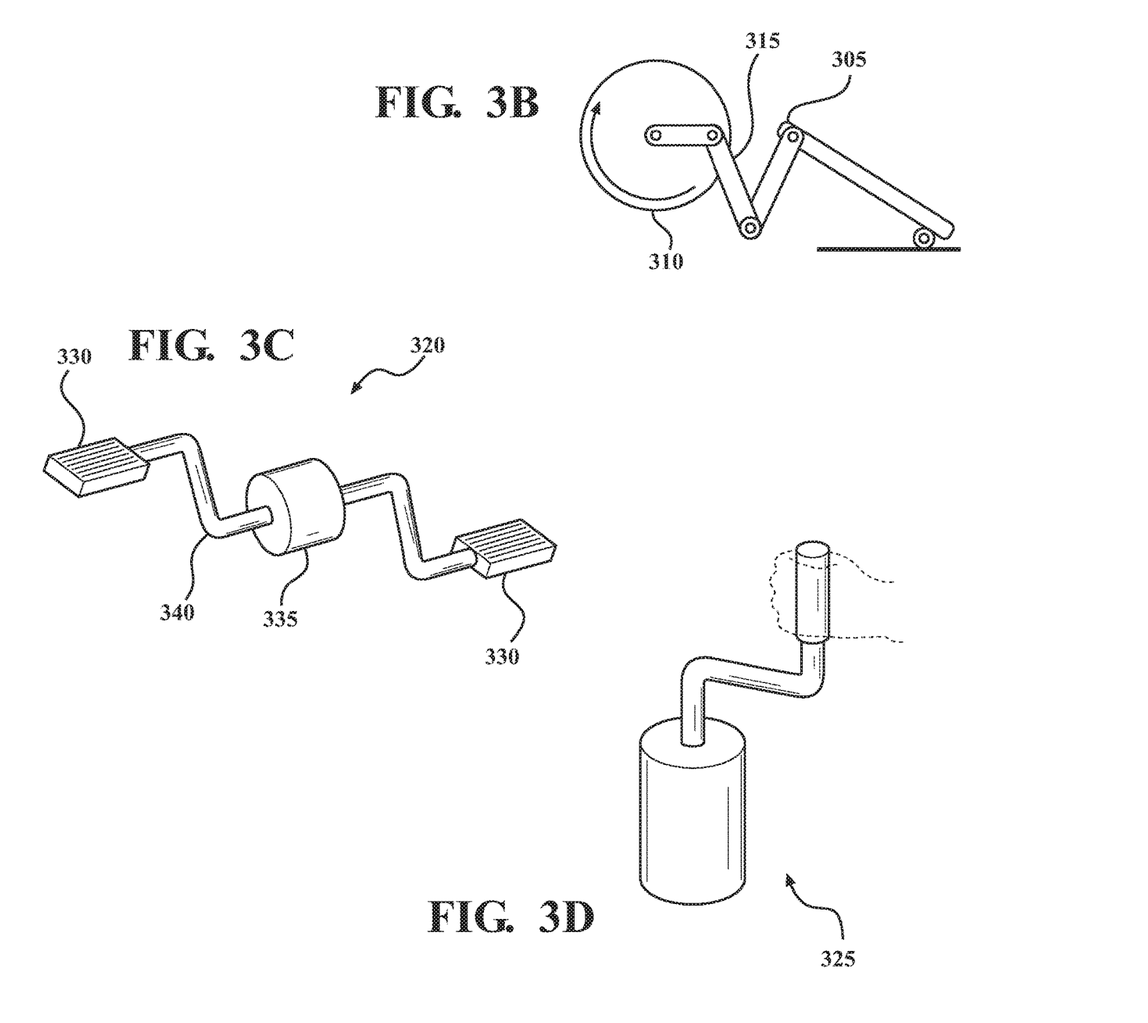
FIG. 3B illustrates an example of a charging device that may be used to perform in-vehicle charging.
FIG. 3C illustrates an example of a charging device that may be used to perform in-vehicle charging.
FIG. 3D illustrates an example of a charging device that may be used to perform in-vehicle charging.

As shown in FIG. 3 several different versions of the charging devices 190 may be connected to the charging system 180. For example, the charging system 180 may connect to a foot pedal 305 that when depressed by a passenger of the vehicle 100 generates electricity that is provided to a battery. The foot pedal 305 is, for example, attached to a flywheel 310 through a linkage 315. Accordingly, the passenger may repeatedly depress the foot pedal 305 to rotate the flywheel 310 thereby generating an electric charge that is provided to a battery of the vehicle 100 via the charging system 180. Moreover, the charging devices 190 may also include a stationary bike 320, a hand crank 325, and/or other mechanical-to-electrical devices that can be operated to generate electricity. For example, the stationary bike 320 includes pedals 330 attached to a generator 335 via a crankshaft 340. Thus, a passenger may pedal the stationary bike 320 while the vehicle 100 is traveling along a route to produce electricity that is used to recharge a battery of the vehicle 100.

Furthermore, the charging devices 190 may be modular (i.e., swappable from the vehicle 100) or integrated with the vehicle 100. As one example, consider FIG. 4, which illustrates a cabin 400 of the vehicle 100. The cabin 400 is illustrated as including seats 410 and charging devices 420. In the illustrated configuration, the vehicle 100 operates in a fully autonomous mode and thus the seats 410 are adjusted to face inward. Additionally, the charging devices 420 are illustrated as being located in front of the seats 410. Thus, in this particular configuration, the charging devices 420 may be stationary bikes such as the bike 320 as shown in FIG. 3. Accordingly, the charging devices 420 may each separately tie into the charging system 180 to provide an electric charge to a battery of the vehicle 100 when operated by a passenger.

Figure 4:
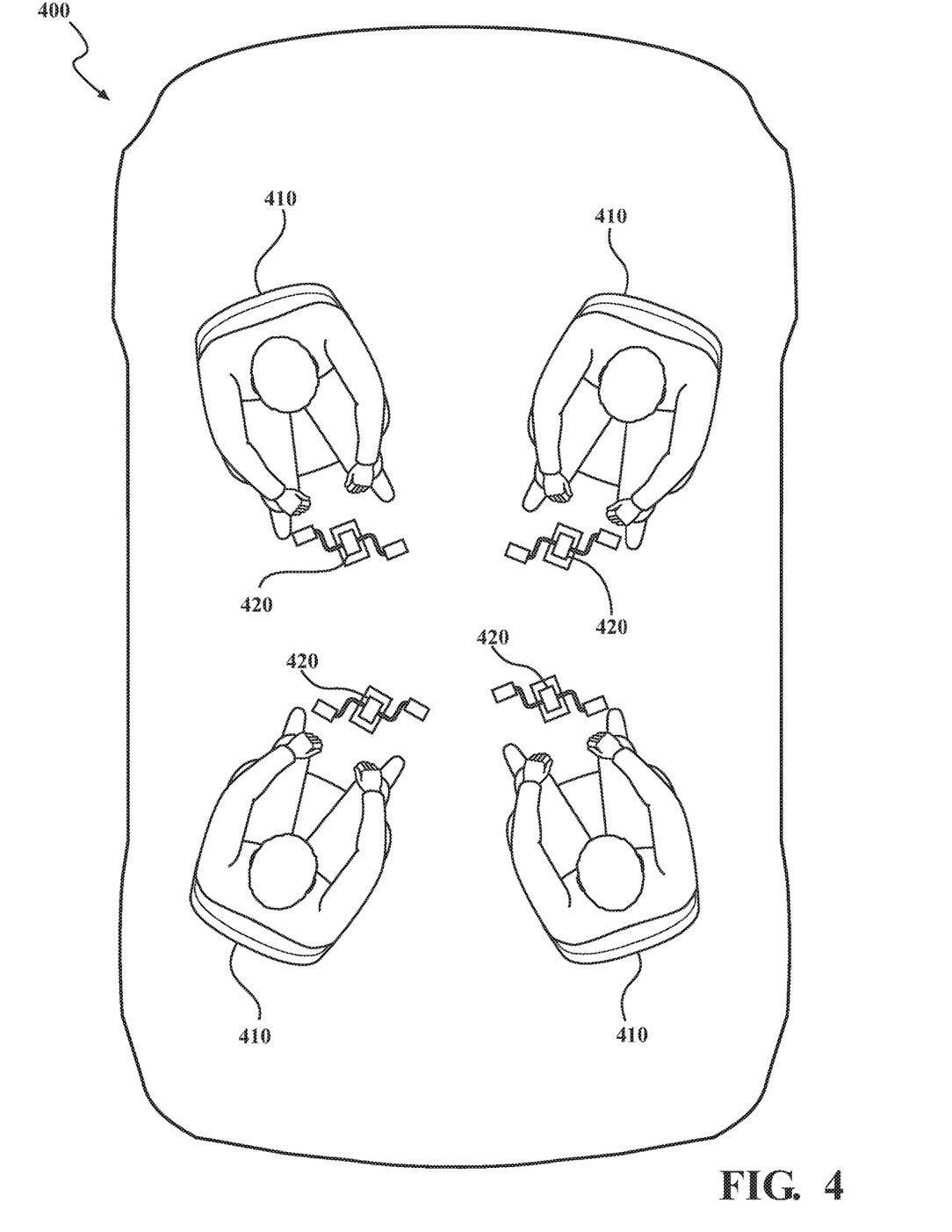
FIG. 4 illustrates an example cabin configuration of a vehicle associated with in-vehicle charging.

In general, the charging devices 420 may be situated within the cabin 400 in many different configurations depending on the vehicle 100 and a manner in which the vehicle operates (e.g., autonomous or manual operation). Moreover, the vehicle 100 may include fewer or more charging devices than illustrated.

Figure 5:
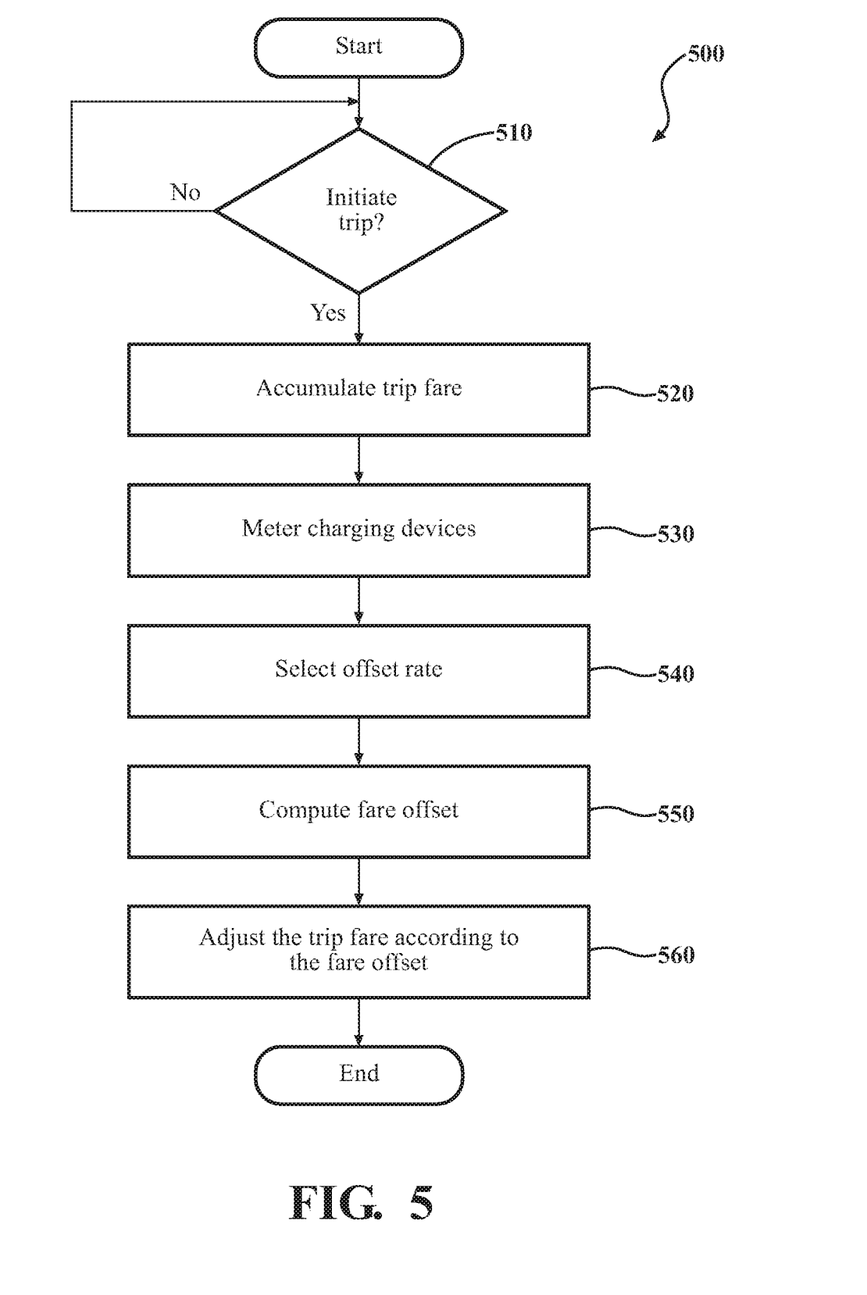
FIG. 5 illustrates one embodiment of a method that is associated with metering in-vehicle charging by a passenger to offset a trip fare.

Additional aspects of metering electric generation and adjusting fares within the vehicle 100 will be discussed in relation to FIG. 5. FIG. 5 illustrates a method 500 associated with metering in-vehicle charging by passengers to offset a trip fare. Method 500 will be discussed from the perspective of the fare adjustment system 170 of FIGS. 1 and 2. While method 500 is discussed in combination with the fare adjustment system 170, it should be appreciated that the method 500 is not limited to being implemented within the fare adjustment system 170, but is instead one example of a system that may implement the method 500.

At 510, the meter module 220 initiates a trip for a passenger in the vehicle 100. In one embodiment, the meter module 220 initiates the trip by transitioning to block 520 and beginning to accumulate the trip fare in response to an electronic input received at 510. The electronic input identifies the passenger and, for example, a location of the passenger in the vehicle 100. The electronic input may be an indicator provided by a driver of the vehicle 100, a login provided by the passenger when the vehicle 100 is operating autonomously, an automated detection signal that detects the passenger sitting in a seat, a communication (e.g., login and sync with systems of the vehicle 100) from a smartphone or another device of the passenger indicating the passenger's presence, a communication from the passenger providing a destination address, or another suitable indicator.

Thus, in one embodiment, the meter module 220 receives information at 510 identifying at least one of the charging devices 190 that the passenger intends to use during the trip. In this way, when the vehicle 100 is providing a ride-sharing service to multiple passengers, a fare offset attributable to each separate passenger may be individually determined. Otherwise, the electric charge generated during the trip is applied against a single overall fare for the trip. In either event, the electronic input also initiates the trip by transitioning the meter module 220 to begin accumulating a trip fare at 520.

In one embodiment, the meter module 220 dynamically accumulates the trip fare, at 520, as the vehicle 100 travels along a route to a destination. For example, as the meter module 220 accumulates mileage and/or time over the trip, the fare is continuously updated to reflect the current distance traveled and time in relation to a beginning point of the trip. In an alternative embodiment, the meter module 220 determines trip fare as a function of charge consumed from a battery of the vehicle 100 over the trip. That is, the meter module 220 determines the trip fare depending on how much electricity from the battery is consumed by the vehicle 100 to undertake the trip. Thus, the meter module 220, in one embodiment, monitors charge levels of the battery and/or dynamic power consumption of electric motors in the vehicle 100.

At 530, the meter module 220 meters electric charge generated from charging devices 190 within the vehicle 100. In one embodiment, blocks 520 and 530 occur in parallel to dynamically determine the corresponding values while the trip is underway. Accordingly, the meter module 220 monitors for electricity provided by the charging devices 190 and tracks an amount of electricity produced by the passenger over the trip. In this way, a contribution of the passenger to a charge of the battery can be isolated. In one embodiment, the meter module 230 provides notifications about the metered charge on a display to the passenger. That is, the meter module 230 can display real-time information about how much charge the passenger is generating, current offset rates, metered charge thresholds to obtain fare offsets, and so on. In still further embodiments, the meter module 230 can display a comparison of outputs between different passengers when a trip is, for example, a rideshare. In such an embodiment, the meter module 230 may award an additional amount of fare offset to one of multiple passengers that produces, for example, a greatest amount of metered charge. In this way, the meter module 230 can display relevant information and incentivize a passenger to produce more charge.

At 540, the fare module 230 selects an offset rate. The offset rate indicates a rate at which compensation is provided in relation to the metered charge from 530. That is, the offset rate specifies a unit per amount of electricity to define an offset against the trip fare. Thus, in one embodiment, the offset rate is an amount of monetary compensation per kilowatt hour. Accordingly, the fare module 230 selects the offset rate according to current electric characteristics of the vehicle 100.

Consequently, in one embodiment, the offset rate is a static value that is selected for the whole trip as, for example, a current kilowatt hour rate charged by a local utility for electricity used by the vehicle to charge a battery. In another embodiment, the offset rate is dynamically selected and varies along the trip according to characteristics of a current segment of the road, and/or demand on a battery by the vehicle 100. Thus, block 540 may also operate in parallel with blocks 520 and 530, in one embodiment. In either case, the vehicle 100 can use location and/or map data from a navigation system of the vehicle to identify current terrain segments (e.g., hills) and select an offset rate accordingly. Alternatively, the fare module 230 can monitor for power draw through the charging system 180 of one or more electric motors and increase the offset rate to correlate with the increased draw. In yet another embodiment, the fare module 230 selects a reduced offset rate according to a weight of the passenger (e.g., increased load) or another factor that negatively impacts the efficiency of the vehicle 100.

In one embodiment, the fare module 230 selects the offset rate by executing a lookup against a lookup table stored in the fare database 240. The lookup table stores, for example, a plurality of offset rates that each correspond with different characteristics of how/where the vehicle 100 is presently operating. Thus, the fare module 230, in one embodiment, provides a current GPS location and heading as an input to the lookup table to obtain the correct fare offset. In another embodiment, the fare module 230 provides a present power draw of the vehicle 100. Consequently, the fare module 230 determines and obtains the fare offset at 540.

Alternatively, in one embodiment, the fare module 230 bypasses selecting the offset rate at 540 and instead indicates a flat offset that is to be used as the fare offset. Accordingly, the are module 230 may lookup the flat offset at 540 in the fare database 240.

At 550, the fare module 230 computes a fare offset for the trip. In one embodiment, the fare module 230 computes the fare offset according to the metered charge from 530 and the offset rate as determined at 540. Accordingly, the fare offset may be individually computed for different road segments and/or operating conditions dynamically as those conditions occur. Thus, the individual offsets may then be accumulated to provide an overall fare offset at 550. The fare offset is an amount by which the trip fare is to be discounted. In general, the fare offset indicates a monetary value. However, the fare offset may also indicate points or another form of compensation by which to adjust the trip fare. As one example, the fare module 230 may grant access to entertainment devices in the vehicle 100 instead of providing a monetary offset.

In yet another embodiment, the fare module 230 determines whether the metered charge satisfies the offset threshold, as previously discussed. When the offset threshold has been satisfied, at 550, then the fare offset is set equal to the flat offset amount and provided as output. However, if the metered charge does not satisfy the offset threshold, then the fare offset is set to null or a zero value and provided as the fare offset.

Moreover, in one embodiment, a passenger can login at the beginning of a trip using identifying credentials associated with an account and accumulate metered fare offset over multiple trips (e.g., over daily commutes). In this way, when an individual trip does not, for example, result in sufficient metered charge to satisfy the threshold, the metered charge is instead accumulated for later use toward a fare offset. Consequently, after multiple trips when the metered charge does satisfy the threshold, a fare offset may then be applied to a current fare. In still a further embodiment, points are accrued according to metered charge during a trip for use at the discretion of the passenger. For example, the passenger may accumulate metered charge over many trips and completely offset a fare for one trip. Additionally, the passenger may choose to share accumulated points associated with accumulated metered charge and so on.

At 560, the fare module 230 adjusts the trip fare according to the fare offset. In one embodiment, the fare module 230 discounts the trip fare as a function of the fare offset to account for an electric charge provided to the vehicle 100 during the trip by one or more passengers. Of course, as noted previously, at block 550, the fare module 230 may also or alternatively provide access to additional components of the vehicle 100 such as an entertainment system or personal mobile device charging in lieu of a monetary adjustment. In either case, the fare adjustment system 170 can provide for extending a range and/or performance of the vehicle 100 by obtaining an additional charge from passengers operating the in-vehicle charging devices 190.

Additionally, the fare and fare offset are generally discussed in a monetary context with the fare being a local currency value and the fare offset being a discount of the local currency value. However, the fare and the fare offset may take many different forms including virtual money, credits, bitcoins, currency and so on. In general, the fare and the fare offset are intended to facilitate a manner of exchange value between participating parties (e.g., driver and passenger).

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the fare adjustment system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the fare adjustment system 170, and/or the autonomous driving module(s) 160 may control some or all of these vehicle systems 140 and, thus, may be partially or fully autonomous.

The processor(s) 110, the fare adjustment system 170, and/or the autonomous driving module(s) 160 can be operatively connected to communicate with the various vehicle systems 140 and/or individual components thereof. For example, returning to FIG. 1, the processor(s) 110, the fare adjustment system 170, and/or the autonomous driving module(s) 160 can be in communication to send and/or receive information from the various vehicle systems 140 to control the movement, speed, maneuvering, heading, direction, etc. of the vehicle 100. The processor(s) 110, the fare adjustment system 170, and/or the autonomous driving module(s) 160 may control some or all of these vehicle systems 140.

The processor(s) 110, the fare adjustment system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the fare adjustment system 170, and/or the autonomous driving module(s) 160 can control the direction and/or speed of the vehicle 100. The processor(s) 110, the fare adjustment system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 either independently or in combination with the fare adjustment system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A fare adjustment system of a vehicle, comprising:
   one or more processors;
   a memory communicably coupled to the one or more processors and storing:
     a meter module including instructions that when executed by the one or more processors cause the one or more processors to, in response to initiating a trip in the vehicle for a passenger as detected by the vehicle, accumulate, by monitoring progress of the trip, a trip fare as a function of traveling a route to fulfill the trip, the trip fare being an amount charged to the passenger for the vehicle transporting the passenger over the trip,
     wherein the meter module includes instructions to meter, through connections to sensors within one or more charging devices in the vehicle, an electric charge generated from the one or more charging devices to identify a metered charge produced by the passenger operating the one or more charging devices during the trip, the one or more charging devices including mechanical-to-electrical generator devices driven by physical exercise of the passenger without input from an outside source; and
     a fare module including instructions that when executed by the one or more processors cause the one or more processors to compute a fare offset according to at least the metered charge provided to a battery of the vehicle as produced by the physical exercise of the passenger to identify an amount by which the trip fare is to be discounted,
     wherein the fare module includes instructions to adjust the trip fare according to the fare offset to account for the metered charge provided to the battery in the vehicle during the trip.

2. The fare adjustment system of claim 1, wherein the fare module includes instructions to compute the fare offset using the metered charge and an offset rate, wherein the fare module includes instructions to select the offset rate according to current electric characteristics of the vehicle, and wherein the trip fare is compensation provided by the passenger for riding in the vehicle for the trip, and
   wherein the fare module includes instructions to adjust the trip fare including instructions to activate one or more additional components within the vehicle for use by the passenger during the trip according to the fare offset.

3. The fare adjustment system of claim 2, wherein the current electric characteristics include a current kilowatt hour rate charged by a local utility for electricity used by the vehicle to charge a battery, and
   wherein the fare module includes instructions to activate one or more additional components including instructions to activate at least one of: an entertainment system and charging for a mobile device according to the fare offset.

4. The fare adjustment system of claim 2, wherein the fare module includes instructions to select the offset rate including instructions to dynamically select the offset rate during the trip from a plurality of offset rates according to characteristics of a current segment of road and demand on a battery of the vehicle for electricity.

5. The fare adjustment system of claim 4, wherein the fare module includes instructions to dynamically select the offset rate including instructions to increase the offset rate when a current demand on a battery increases from the characteristics of the current segment of the road.

6. The fare adjustment system of claim 1, wherein the fare module includes instructions to compute the fare offset as a flat offset when the metered charge satisfies an offset threshold, wherein the metered charge is an amount of electricity provided to the vehicle by the passenger during the trip, and wherein the trip is a ride sharing trip for which the vehicle charges the trip fare as a function of distance traveled and time taken for the trip.

7. The fare adjustment system of claim 1, wherein the vehicle is an autonomous vehicle that operates autonomously to transport the passenger for the trip.

8. The fare adjustment system of claim 1, wherein the vehicle is a hybrid electric vehicle or a fully electric vehicle.

9. A non-transitory computer-readable medium storing instructions that when executed by one or more processors cause the one or more processors to:
   in response to initiating a trip in a vehicle for a passenger as detected by the vehicle, accumulate, by monitoring progress of the trip, a trip fare as a function of traveling a route to fulfill the trip, the trip fare being an amount charged to the passenger for the vehicle transporting the passenger over the trip;
   meter, through connections to sensors within one or more charging devices in the vehicle, an electric charge generated from the one or more charging devices to identify a metered charge produced by the passenger operating the one or more charging devices during the trip, the one or more charging devices including mechanical-to-electrical generator devices driven by physical exercise of the passenger without input from an outside source;
   compute a fare offset according to at least the metered charge provided to a battery of the vehicle as produced by the physical exercise of the passenger to identify an amount by which the trip fare is to be discounted; and
   adjust the trip fare according to the fare offset to account for the metered provided to the battery in the vehicle during the trip.

10. The non-transitory computer-readable medium of claim 9, wherein the instructions include instructions to compute the fare offset using the metered charge and an offset rate, wherein the instructions include instructions to select the offset rate according to current electric characteristics of the vehicle,
    wherein the current electric characteristics include a current kilowatt hour rate charged by a local utility for electricity used by the vehicle to charge a battery, and
    wherein the instructions to select the offset rate include instructions to dynamically select the offset rate during the trip from a plurality of offset rates according to characteristics of a current segment of road and demand on a battery of the vehicle for electricity.

11. The non-transitory computer-readable medium of claim 10, wherein the trip fare is compensation provided by the passenger for riding in the vehicle for the trip, and
wherein the instructions to dynamically select the offset rate include instructions to increase the offset rate when a current demand on a battery increases from the characteristics of the current segment of the road.

12. The non-transitory computer-readable medium of claim 9, wherein the instructions to compute the fare offset include instructions to compute the fare offset as a flat offset when the metered charge satisfies an offset threshold, wherein the metered charge is an amount of electricity provided to the vehicle by the passenger during the trip, and
wherein the trip is a ride sharing trip for which the vehicle charges the trip fare as a function of distance traveled and time taken for the trip.

13. The non-transitory computer-readable medium of claim 9, wherein the vehicle is an autonomous vehicle that operates autonomously to transport the passenger for the trip, and
wherein the instructions to adjust the trip fare include instructions to activate at least one of: an entertainment system and charging for a mobile device within the vehicle for use by the passenger during the trip and according to the fare offset.

14. A method of adjusting a trip fare within a vehicle, comprising:
in response to initiating a trip in the vehicle for a passenger as detected by the vehicle, accumulating, by monitoring progress of the trip, the trip fare as a function of traveling a route to fulfill the trip, the trip fare being an amount charged to the passenger for the vehicle transporting the passenger over the trip;
metering, by the vehicle through connections to sensors within the vehicle, one or more charging devices in the vehicle, an electric charge generated from the one or more charging devices to identify a metered charge produced by the passenger operating the one or more charging devices during the trip, the one or more charging devices including mechanical-to-electrical generator devices driven by physical exercise of the passenger without input from an outside source;
computing, by the vehicle, a fare offset according to at least the metered charge provided to a battery of the vehicle as produced by the physical exercise of the passenger to identify an amount by which the trip fare is to be discounted; and
adjusting the trip fare according to the fare offset to account for the metered charge provided to the battery in the vehicle during the trip.

15. The method of claim 14, wherein computing the fare offset includes using the metered charge and an offset rate, wherein the method further comprising:
selecting the offset rate according to current electric characteristics of the vehicle, wherein the trip fare is compensation provided by the passenger for riding in the vehicle for the trip, and
wherein adjusting the trip fare includes activating one or more additional components within the vehicle for use by the passenger during the trip according to the fare offset.

16. The method of claim 15, wherein the current electric characteristics include a current kilowatt hour rate charged by a local utility for electricity used by the vehicle to charge a battery, and
wherein activating one or more additional components includes activating at least one of: an entertainment system and charging for a mobile device according to the fare offset.

17. The method of claim 15, wherein selecting the offset rate includes dynamically selecting the offset rate during the trip from a plurality of offset rates according to characteristics of a current segment of road and demand on a battery of the vehicle for electricity.

18. The method of claim 17, wherein dynamically selecting the offset rate includes increasing the offset rate when a current demand on a battery increases from the characteristics of the current segment of the road.

19. The method of claim 14, wherein computing the fare offset includes using a flat offset when the metered charge satisfies an offset threshold,
wherein the metered charge is an amount of electricity provided to the vehicle by the passenger during the trip, and
wherein the trip is a ride sharing trip for which the vehicle charges the trip fare as a function of distance traveled and time taken for the trip.

20. The method of claim 14, wherein the vehicle is an autonomous vehicle that operates autonomously to transport the passenger for the trip.

* * * * *